United States Patent
Levin et al.

(10) Patent No.: US 9,460,384 B2
(45) Date of Patent: Oct. 4, 2016

(54) EFFECTING MODULATION BY GLOBAL SCALAR VALUES IN A SPIKING NEURAL NETWORK

(71) Applicant: QUALCOMM Incorporated, San Diego, CA (US)

(72) Inventors: Jeffrey Alexander Levin, San Diego, CA (US); Yinyin Liu, San Diego, CA (US); Sarah Paige Gibson, San Diego, CA (US); Michael Campos, La Jolla, CA (US); Vikram Gupta, San Diego, CA (US); Victor Hokkiu Chan, Del Mar, CA (US); Edward Hanyu Liao, San Diego, CA (US); Erik Christopher Malone, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 303 days.

(21) Appl. No.: 14/260,140

(22) Filed: Apr. 23, 2014

(65) Prior Publication Data
US 2015/0161506 A1    Jun. 11, 2015

Related U.S. Application Data

(60) Provisional application No. 61/914,823, filed on Dec. 11, 2013.

(51) Int. Cl.
*G06N 3/08* (2006.01)
*G06N 3/04* (2006.01)

(52) U.S. Cl.
CPC ............... *G06N 3/08* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 8,429,107 B2 | 4/2013 | Denneau et al. | |
| 9,213,937 B2* | 12/2015 | Ponulak | G06N 3/049 |
| 2012/0016829 A1 | 1/2012 | Snider | |
| 2012/0084241 A1 | 4/2012 | Friedman et al. | |
| 2012/0117012 A1* | 5/2012 | Szatmary | G06F 19/12 706/27 |
| 2013/0073491 A1 | 3/2013 | Izhikevich et al. | |
| 2013/0073495 A1 | 3/2013 | Izhikevich et al. | |
| 2015/0106316 A1* | 4/2015 | Birdwell | G06N 3/063 706/33 |

FOREIGN PATENT DOCUMENTS

WO    WO-2005115367 A2    12/2005

OTHER PUBLICATIONS

Pawlak et al, Timing is not everything: neuromodulation opens the STDP gate, 2010.*
Shen et al, Dichototomous Dopaminergic Control of Striatal Synaptic Plasticity, 2008.*

(Continued)

*Primary Examiner* — Stanley K Hill
*Assistant Examiner* — Mikayla Chubb
(74) *Attorney, Agent, or Firm* — Patterson & Sheridan, LLP

(57) ABSTRACT

Methods and apparatus are provided for effecting modulation using global scalar values in a spiking neural network. One example method for operating an artificial nervous system generally includes determining one or more updated values for artificial neuromodulators to be used by a plurality of entities in a neuron model and providing the updated values to the plurality of entities.

20 Claims, 14 Drawing Sheets

(56) References Cited

OTHER PUBLICATIONS

Hartley T., et al., "Space in the brain: how the hippocampal formation supports spatial cognition", Journal of Experimental Medicine, vol. 297, No. 5868, Dec. 23, 2013 (Dec. 23, 2013), pp. 1-18, XP055184662, ISSN: 1476-4687, DOI: 10.1038/297681a0 p. 1-p. 13, right-hand column, paragraph 4.
International Search Report and Written Opinion—PCT/US2014/064949—ISA/EPO—Apr. 30, 2015.
Izhikevich E.M., "Solving the Distal Reward Problem Through Linkage of STDP and Dopamine Signaling", Cerebral Cortex, Jan. 13, 2007 (Jan. 13, 2007), pp. 1-10, XP007914378, ISSN: 1566-6816, DOI: 10.1893/CERCOR/BHL152 [retrieved on Jan. 13, 2007] p. 1-p. 9, right-hand column paragraph 1.
Pawlak V., et al., "Timing is not everything: neuromodulation opens the STDP gate", Frontiers in Synaptic Neuroscience, vol. 2, Jan. 1, 2010 (Jan. 1, 2010), p. 146, XP055184224, ISSN: 1663-3563, DOI: 10.3389/fnsyn.2010.00146 p. 1-p. 11, left-hand column, paragraph 3.
Thivierge J.P., et al., "Spiking neurons, dopamine, and plasticity: timing is everything, but concentration also matters", Synapse, vol. 61, No. 6, Jan. 1, 2007 (Jan. 1, 2007), pp. 375-390, XP055123325, DOI: 10.1002(syn.20378 p. 375-p. 388, right-hand column, paragraph 3.
Vogt S.M., et al., "Neuromodulation of Stop through short-term changes in firing causality", Cognitive Neurodynamics, Springer Netherlands, Dordrecht, vol. 6, No. 4, Jul. 25, 2012 (Jul. 25, 2012), pp. 353-366, XP035092546, ISSN: 1871-4099, DOI: 10.1007/S11571-012-9202-4 p. 353-p. 366, left-hand column, paragraph 4.
Potjans W., et al., "Enabling functional neural circuit simulations with distributed computing of neuromodulated plasticity", Frontiers in Computational Neuroscience, vol. 4, No. 141, Nov. 23, 2010 (Nov. 23, 2010), pp. 1-9, XP055179255, DOI: 10.3389/fncom.2010.00141 p. 1-p. 14, right-hand column, paragraph 2.

\* cited by examiner

EFFECTING MODULATION BY GLOBAL SCALAR VALUES IN A SPIKING NEURAL NETWORK

CLAIM OF PRIORITY UNDER 35 U.S.C. §119

This application claims benefit of U.S. Provisional Patent Application Ser. No. 61/914,823, filed Dec. 11, 2013 and entitled "Effecting Modulation by Global Scalar Values in a Spiking Neural Network," incorporated by reference in its entirety.

BACKGROUND

1. Field

Certain aspects of the present disclosure generally relate to artificial nervous systems and, more particularly, to effecting modulation with global scalar values in spiking neural networks.

2. Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to effecting modulation using global scalar values in spiking neural networks.

Certain aspects of the present disclosure provide a method for operating an artificial nervous system. The method generally includes determining one or more updated values for artificial neuromodulators to be used by a plurality of entities in a neuron model and providing the updated values to the plurality of entities.

Certain aspects of the present disclosure provide an apparatus for operating an artificial nervous system. The apparatus generally includes a processing system and a memory coupled to the processing system. The processing system is typically configured to determine one or more updated values for artificial neuromodulators to be used by a plurality of entities in a neuron model and to provide the updated values to the plurality of entities.

Certain aspects of the present disclosure provide an apparatus for operating an artificial nervous system. The apparatus generally includes means for determining one or more updated values for artificial neuromodulators to be used by a plurality of entities in a neuron model and means for providing the updated values to the plurality of entities.

Certain aspects of the present disclosure provide a computer program product for operating an artificial nervous system. The computer program product generally includes a computer-readable medium having instructions executable to determine one or more updated values for artificial neuromodulators to be used by a plurality of entities in a neuron model and to provide the updated values to the plurality of entities.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
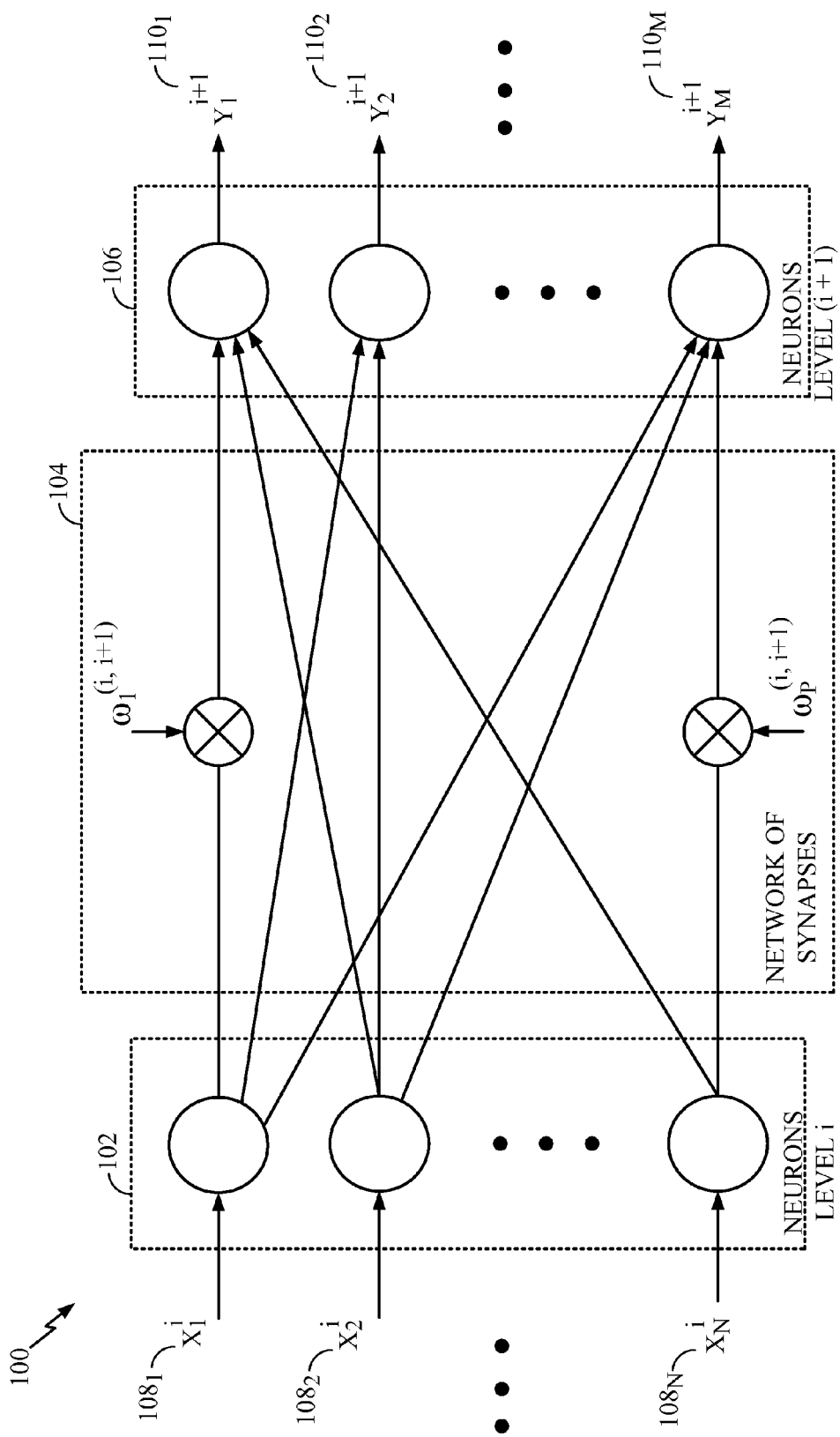
FIG. 1 illustrates an example network of neurons, in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
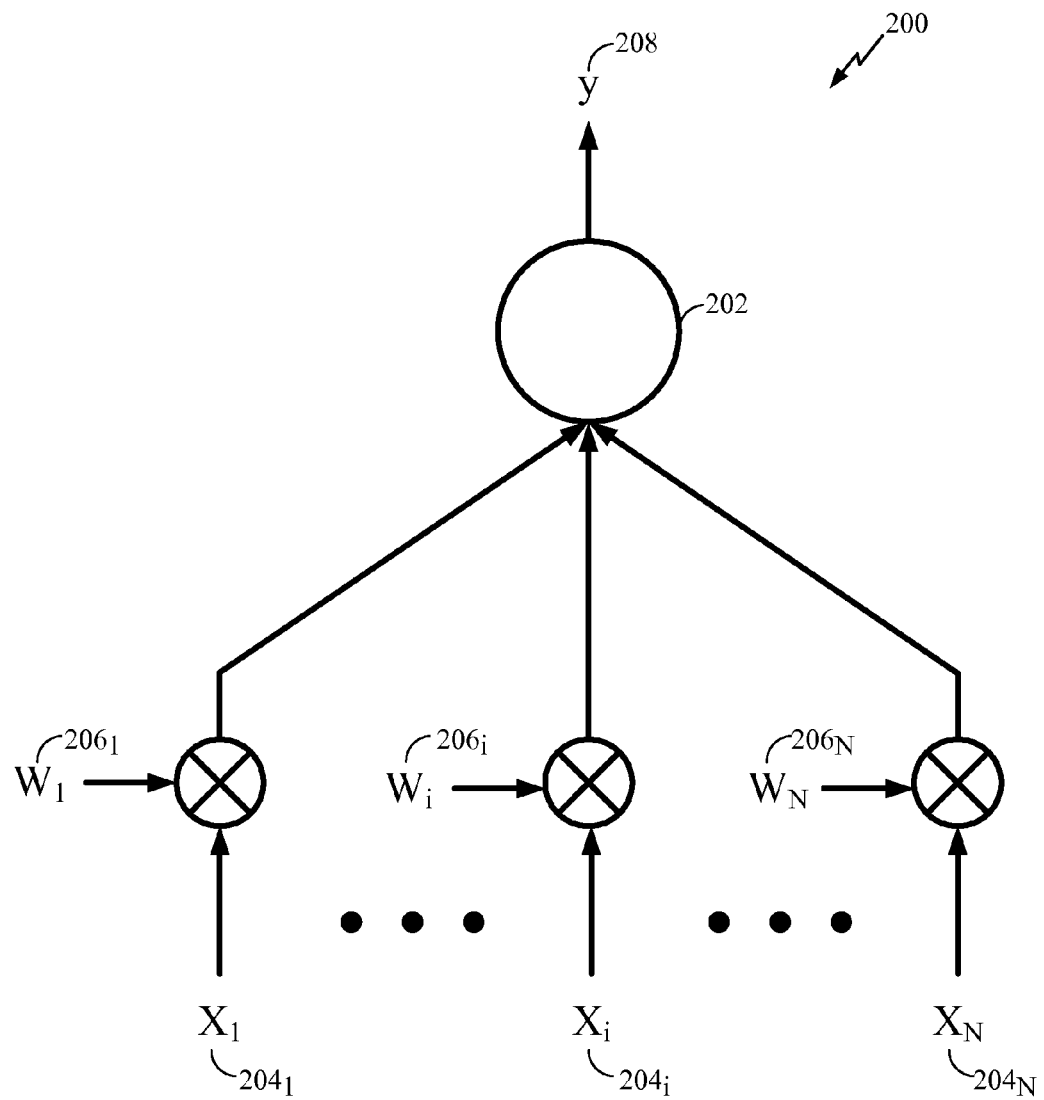
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{-t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
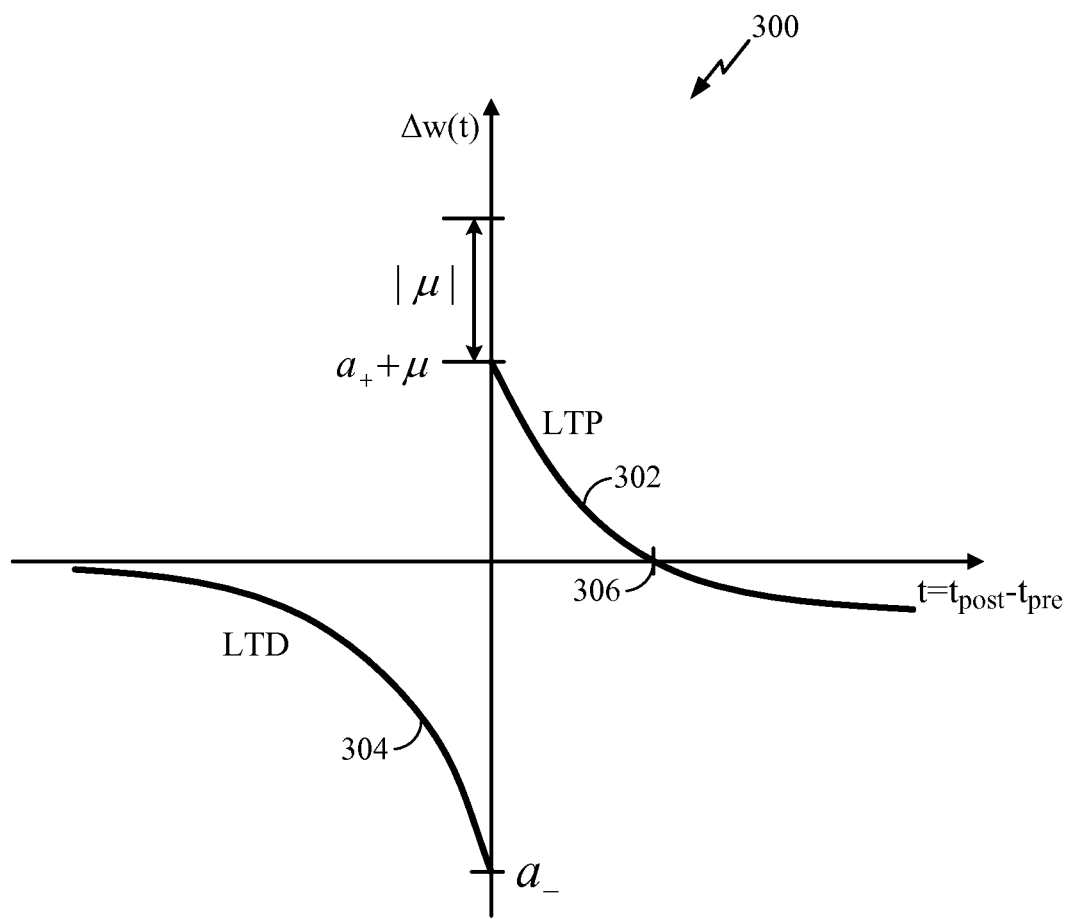
FIG. 3 illustrates an example spike-timing dependent plasticity (STDP) curve, in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
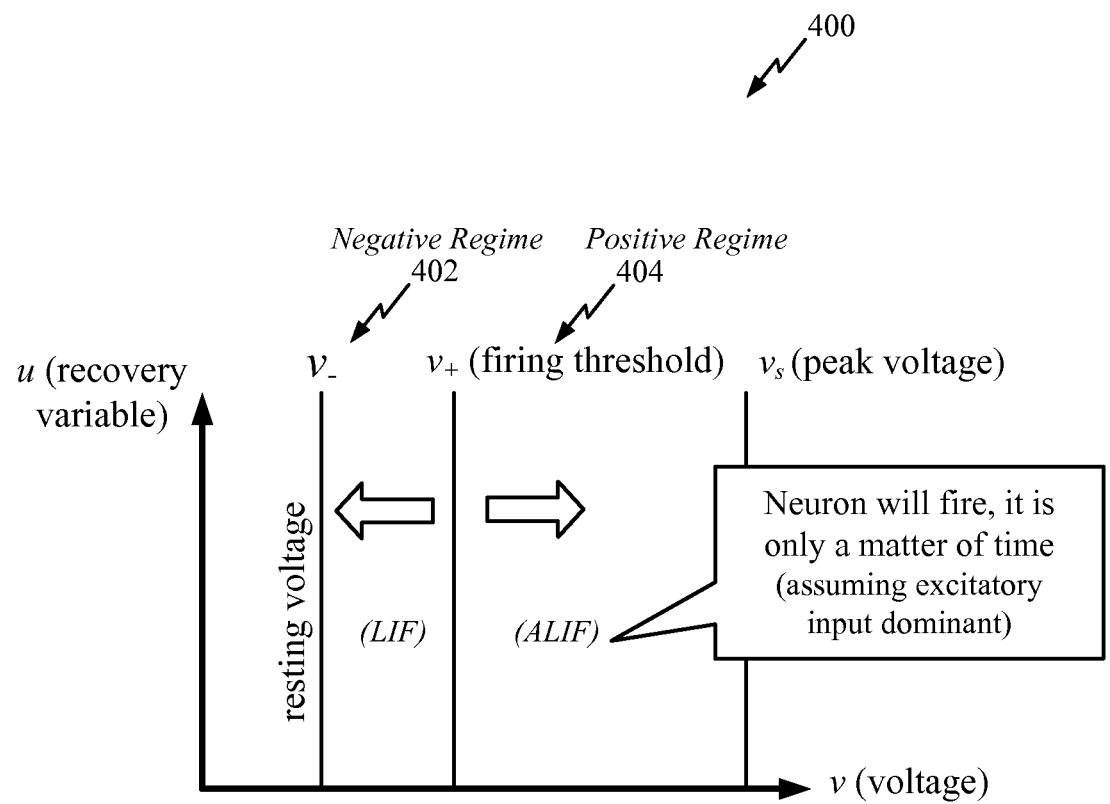
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest (v_) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r \quad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \quad (13)$$

If a spike is defined as occurring at the time the voltage state $v$ reaches $v_s$, then the closed-form solution for the amount of time, or relative delay, until a spike occurs as measured from the time that the voltage is at a given state $v$ is $$\Delta t_s = \begin{cases} \tau_+ \log \frac{v_s + q_+}{v + q_+} & \text{if } v > \hat{v}_+ \\ \infty & \text{otherwise} \end{cases} \quad (14)$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the levels of neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Effecting Modulation Using Global Scalar Values in a Spiking Neural Network

Spiking neural networks (SNNs, e.g., the neural network 100 from FIG. 1) model spike transmission between artificial neurons (or neural processing units) using axonal and/or synaptic connections. The axon and synapse between the somas of any two connected artificial neurons may each have a delay associated therewith. SNNs may comprise scalar signals that modulate synaptic efficacy and neuronal excitability. These modulatory signals may be applied to a specified synapse or neuron state variables. However, the cost of communicating these global signals may be high in an SNN simulator. In an SNN, where data can only be transmitted through spikes, efficient methods of setting and communicating values to affected neurons and synapses may be desired.

Figure 5:
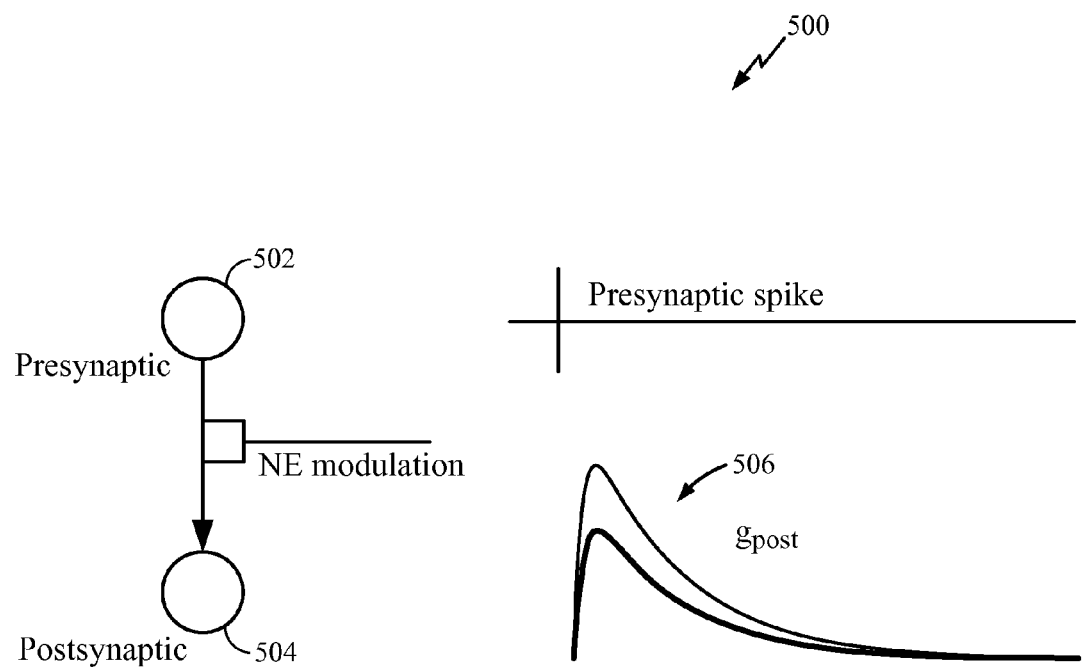
FIG. 5 conceptually illustrates an example norepinephrine (NE) modulation, in accordance with certain aspects of the present disclosure.

In a natural nervous system, a variety of neuromodulators may be utilized to regulate neuron activity. For example, as illustrated in an example 500 in FIG. 5, norepinephrine (NE) modulation provides flexible gain control of synaptic transmission between a pre-synaptic neuron 502 and a post-synaptic neuron 504 without inducing plasticity. The flexible post-synaptic gain is illustrated in graph 506 in FIG. 5. The NE modulation does not change the synaptic weight, but it may temporarily change synaptic efficacy by scaling input currents. For example, as illustrated in FIG. 5, the effective synaptic weight may be scaled as:

$$w_{syn} = \overline{w}_{syn}(1 + m_{NE}(t)), \tag{15}$$

where $\overline{w}_{syn}$ is the synaptic weight before applying the NE modulation and $m_{NE}(t)$ is the NE modulation gain that changes over time.

Another example of a natural neuromodulator is acetylcholine (Ach), which may affect both synaptic efficacy and neural excitability. Like NE, Ach may allow for flexible gain control of synaptic transmission. Ach may also directly affect a neuron's current and conductance, independent of spiking activity. Neurons may react to Ach by lowering their spiking thresholds or by applying a bias current. Further examples of natural neuromodulators include dopamine, which affects cognitive behavior (e.g., response to a behavior changing stimulus), and serotonin, which regulates mood. Neuromodulators may affect, for example, the sign or magnitude of STDP, thresholds, scaling vectors, and the like.

In an artificial nervous system, artificial analogues to natural neuromodulators may be implemented. For certain aspects of the present disclosure, neuromodulator values may be implemented as global values. Setting the neuromodulator values may be complicated by having to do so in an artificial nervous system where values are transmitted as spikes, rather than analog values. Furthermore, setting the neuromodulator values separately for each affected entity may be inefficient since each entity receives the same value. Input currents may be scaled to emulate neuromodulation, which may be accomplished at the artificial neuron or the synapse level. Since certain synapses and neurons in an artificial nervous system may be configured to be affected by neuromodulators while others are not, certain aspects of the present disclosure may indicate which synapses and/or neurons are affected by neuromodulators. Various implementations of this may have varying granularity of control.

Figure 6A:
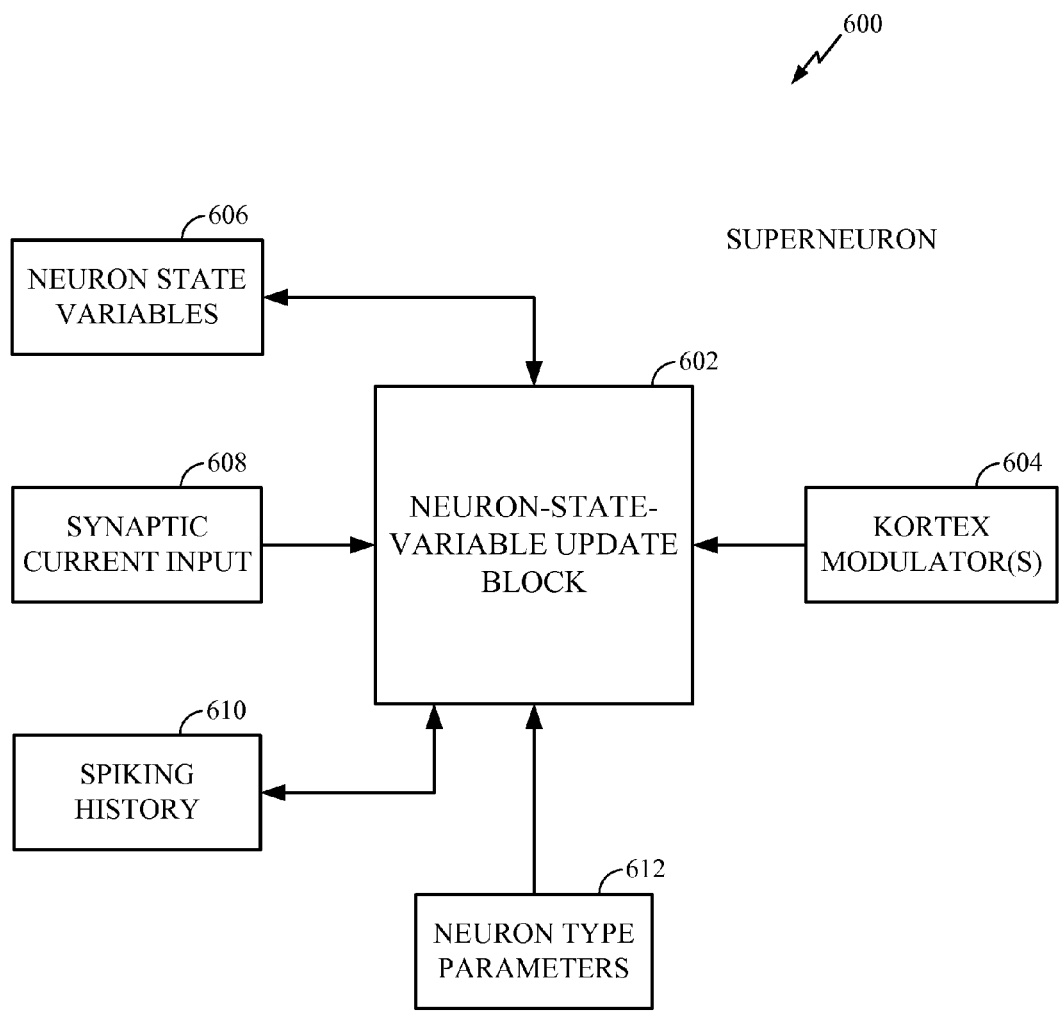
FIGS. 6A and 6B are block diagrams of example super-neurons for effecting neuromodulation, in accordance with certain aspects of the present disclosure.

FIG. 6A is a block diagram of an example superneuron 600 according to certain aspects of the present disclosure. According to certain aspect of the present disclosure, the superneuron 600 may emulate a plurality of artificial neurons in an artificial nervous system. As illustrated in FIG. 6A, the superneuron 600 may comprise a neuron-state-variable update block 602, Kortex Modulators ("KMs") 604, neuron state variables 606, synaptic current inputs 608, a spiking history block 610, and a neuron type parameters block 612. In an aspect of the present disclosure, the neuron type parameters block 612 may represent a memory that stores indication whether or not the artificial neurons are affected by each neuromodulator. Neuron state variables may be updated in the neuron-state-variable update block 602 based at least in part on, for example, synaptic inputs (via spiking events). The update block 602 may be configured to update artificial neurons and/or synapses for at least a portion of an artificial nervous system. In an aspect of the present disclosure, spike events may be generated in the neuron-state-variable update block 602 and then saved in the spiking history block 610. The spiking history information may be also pulled out of the spiking history block 610 and used to condition (spike replay) events that are known about in the neuron-state-variable update block 602.

According to certain aspects of the present disclosure, neuromodulator values may be stored as global (shared) values in the KM 604. The KM 604 may be a separate register inside the superneuron 600. For certain aspects, scaling may be performed in each neuron of the superneuron 600 on a per-input-channel-per-neuron-type basis. It should be noted that each neuron may have any number of separate input channels. For example, each neuron may comprise N channels with different dynamics that can affect the neuron state in different ways. Synaptic inputs may project to one or more of the neuron's input channels.

The KM 604 may behave as a special type of artificial neuron that holds the neuromodulator state variables. Internal state variables may be continuously used by other processing blocks, while other units may share data via spiking events. According to certain aspects of the present disclosure, other artificial neurons may be configured to connect with the KM 604 using special synapse types (e.g., one for each neuromodulator type) with weights equal to a neuromodulator value increment. When a pre-synaptic neuron spikes, the appropriate neuromodulator value within the KM 604 may be incremented by the neuromodulator value increment. Because the KM 604 may act like a unit, the KM's state variables may be updated each time step (e.g., "tau" time period) in the artificial nervous system. Alternatively, the updates may happen more frequently or less frequently than every "tau" time period (e.g., upon receipt of an incoming spike). In an aspect of the present disclosure, state variable filter parameters, which may include gain and decay rate, may be configurable.

Figure 6B:
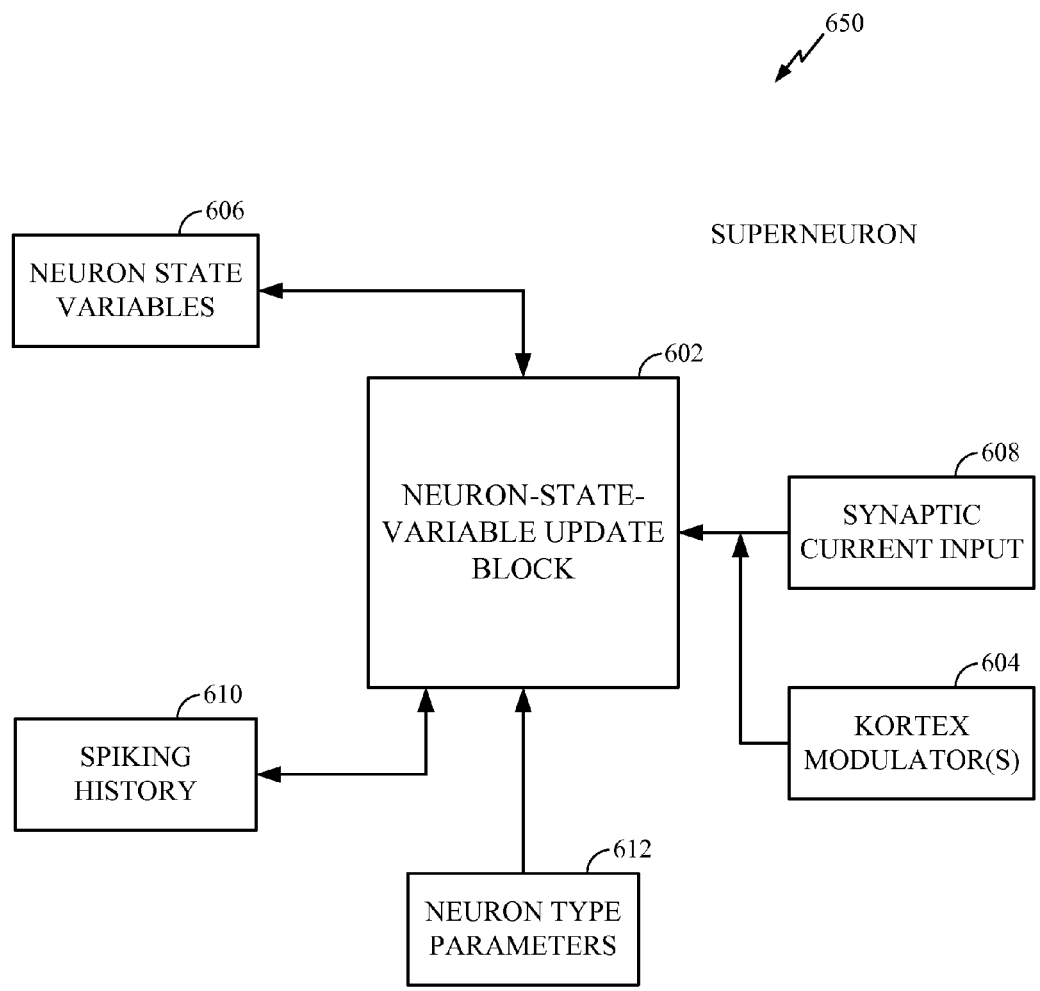

FIG. 6B is a block diagram of another example superneuron 650 according to certain aspects of the present disclosure. In the superneuron 650, the global neuromodulator values stored in the KM 604 may be used to scale the synaptic current inputs 608, which may be closer to biological function of synaptic efficacy, rather than being directly input to the neuron-state-variable update block 602, as in the example superneuron 600 in FIG. 6A.

Figure 7:
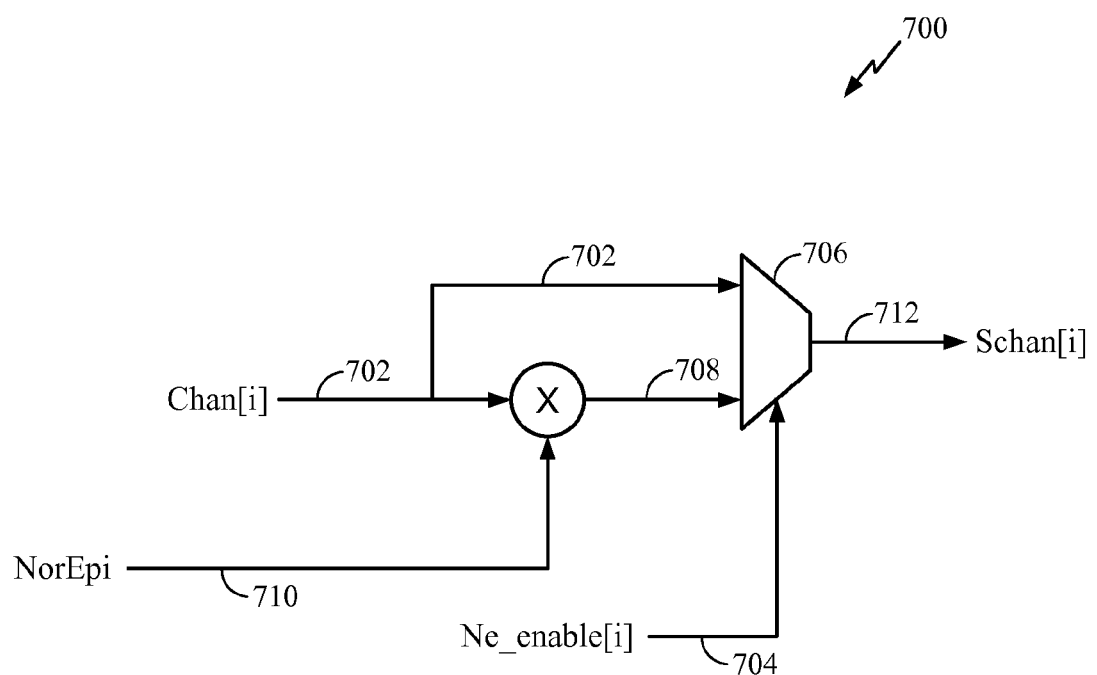
FIG. 7 is a schematic of an example circuit for selecting a modulated or non-modulated input channel based on an indication whether the input channel is affected by norepinephrine, in accordance with certain aspects of the present disclosure.

In accordance with certain aspects of the present disclosure, an artificial neuron may have access to neuromodulator levels. Synaptic inputs (current/conductance) may be scaled in the neuron for affected channels. A neuron type may have one or more flags indicating whether synaptic input channels react to a particular neuromodulator and, if so, how the neuron type reacts. As illustrated in the example circuit 700 of FIG. 7 for the NE neuromodulator, each input channel (e.g., Chan[i] 702) of each neuron type may have a flag 704 (e.g., Ne_enable[i]) indicating whether this input channel will be scaled by the NE. A multiplexer 706 may select between a non-modulated input channel 702 and a modulated input channel 708, where the modulated input channel 708 is modulated by a value 710 (e.g., NorEpi) representing, for example, the scaling factor associated with norepinephrine for the neuron type. The control signal for the multiplexer 706 may be the flag 704 (e.g., Ne_enable[i]) indicating whether the channel is enabled for norepinephrine. Based on the enable flag 704, the multiplexer 706 selects whether to output the non-modulated input channel 702 or modulated input channel 708 into a "scaled channel" output 712 (Schan[i]).

Figure 8:
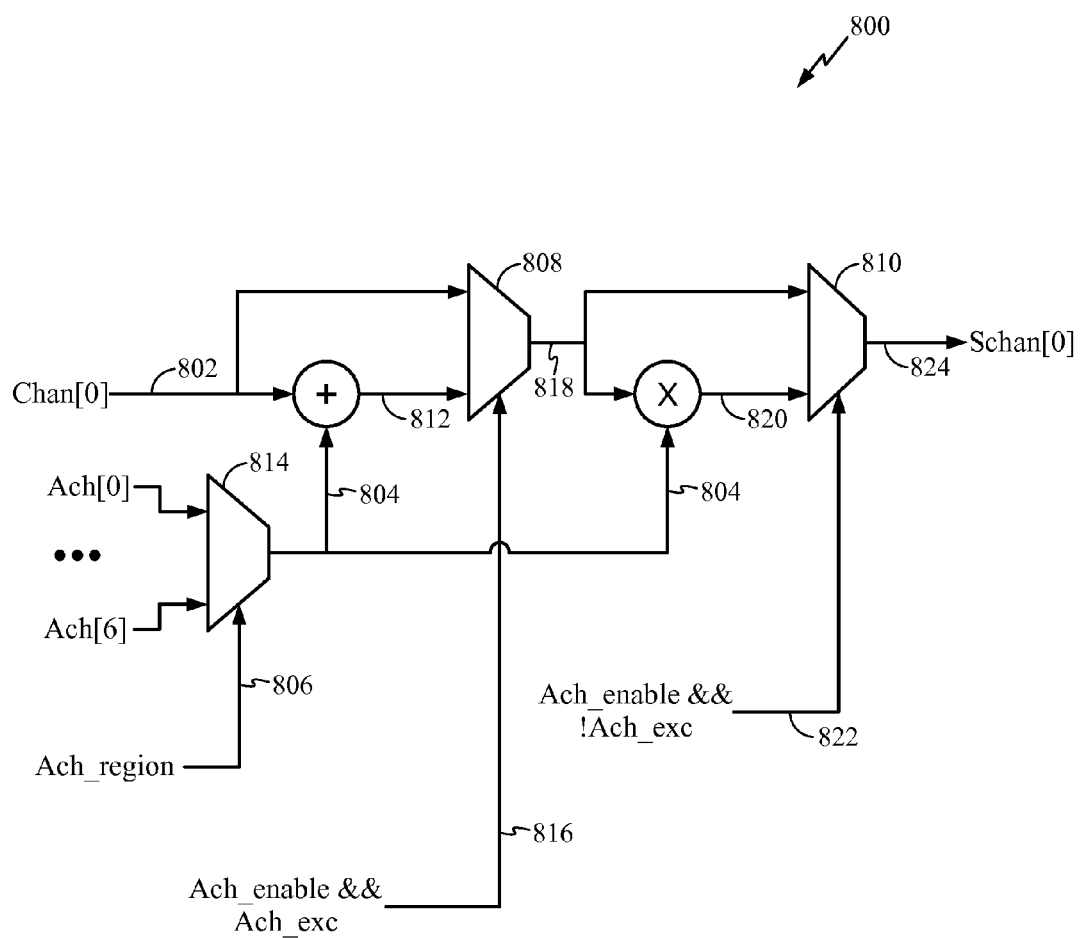
FIG. 8 is a schematic of an example circuit for selecting a modulated or non-modulated input channel based on an indication whether the input channels is affected by acetylcholine (Ach), in accordance with certain aspects of the present disclosure.

As illustrated in the example circuit 800 of FIG. 8 for the Ach neuromodulator, each neuron type may have a flag (e.g., Ach_enable) indicating whether a predetermined channel 802 (e.g., Chan[0]) will be scaled by Ach 804. In accordance with certain aspects of the present disclosure, this approach may be applied to any one of the neuron's input channels or any combination of the input channels. Each neuron type may also have a code 806 (e.g., Ach_region) indicating by which Ach region (e.g., Ach[0] to Ach[6]) the neuron type is affected. Another flag (e.g., Ach_exc) may also indicate a neural excitability mode (as opposed to a synaptic efficacy mode, or vice versa).

In the example circuit 800, a first multiplexer 808 may select to output to a second multiplexer 810 an unmodulated input channel 802 (e.g., Chan[0]) or a modulated input channel 812, where the modulation is based on the affected region selected by a third multiplexer 814 using, for example, the code 806 (Ach_region). The first multiplexer 808 may select the unmodulated channel 802 or the modulated channel 812 based on whether the input channel is to be scaled by Ach (e.g., based on Ach_enable) and the neural excitability mode (e.g., based on Ach_exc) represented with a flag 816 (Ach_enable && Ach_exc) to generate a first output channel 818. The first output channel 818 may be provided, unmodulated, to the second multiplexer 810. Additionally, the first output channel may be modulated according to the Ach region (i.e., scaled by Ach[i] 804) and provided to the second multiplexer 810 as a modulated channel 820. Based on whether Ach is enabled and the inverse of the excitability mode (i.e., based on a flag 822 equal to Ach_enable && !Ach_exc), the second multiplexer 810 may select between the modulated first output channel 818 or the non-modulated first output channel 820 as the second output channel 824 (scaled channel, or Schan[0]).

In accordance with certain aspects of the present disclosure, a variety of approaches may be used to implement modulation with global scalar values in a spiking neural network, such as per-synapse control, per-synapse-type control, per-neuron control, per-neuron-type control, and per-input-channel-per-neuron-type control. Per-synapse control with scaling in a synapse may offer the most precise control, but may use the most memory. Per-synapse-type control with scaling in a synapse may involve redundant computations (which wastes power). Per-neuron control with scaling in a neuron may entail using a large amount of memory, but fewer computations. Per-neuron-type control with scaling in a neuron may offer the least precise control, but uses the least memory and computations. Per-input-channel-per-neuron-type control with scaling in a neuron may offer a balance between precision and the amount of memory and computations.

Since, in a spiking neural network, data may be exchanged during spike events, modifications to an artificial nervous system's behavior using neuromodulators may be performed during spike events. Updates for some neuromodulators may be performed during a primary spike event. For some neuromodulators (e.g., analogues to dopamine), an artificial nervous system may be configured to transmit an updated value corresponding to the neuromodulator during a replay event rather than a primary spike event.

In an aspect, information about neuromodulators may be transmitted in the form of a data set, like an array, with each element of the data set corresponding to a different neuromodulator type (for example, element 0 of the data set may correspond to norepinephrine, element 1 may correspond to acetylcholine, and so on). Each of the one or more neurons in the artificial nervous system may read the array during the spiking event. In an aspect where each of the one or more neurons has one or more flags indicating whether the neuron is affected by a neuromodulator, each of the one or more neurons may choose to read values only for the neuromodulators that affect the neuron. After reading values for the group of neuromodulators the neuron is affected by, the neuron can modulate its activity based on the read neuromodulator values.

In an aspect, each neuron may access one or more memory locations containing information about neuromodulator values corresponding to the neuromodulators that affect the behavior of each neuron. For example, neuron models may be configured to have one or more flags indicating whether a neuron is affected by a neuromodulator. Based on the value of the one or more flags, a neuron may retrieve updated values for a selected group of neuromodulators and modulate its activity based on the retrieved values.

For certain other aspects of the present disclosure, each neuron or synapse may store a local copy of neuromodulator values. The synapses connected with a neuromodulator block (e.g., the KM block 604 from FIGS. 6A-6B) may instead connect with a dedicated memory location within each neuron or within each synapse in an effort to set the neuromodulator values. Replacing the KM block with a local storage of neuromodulator values in each neuron or synapse may increase memory usage and the number of computations.

Effecting modulation using global scalar values in a spiking neural network may offer several advantages. For example, neuromodulators implemented in this manner may allow for global transient changes to network operations. This may provide for, by way of example, selective focusing (e.g., using NE), where an artificial nervous system (with constant synaptic weights) may respond differently to the same stimulus depending on the instantaneous value of NE. Neuromodulators in an artificial nervous system may also be used, for example, in a foraging model for decision-making.

Figure 9:
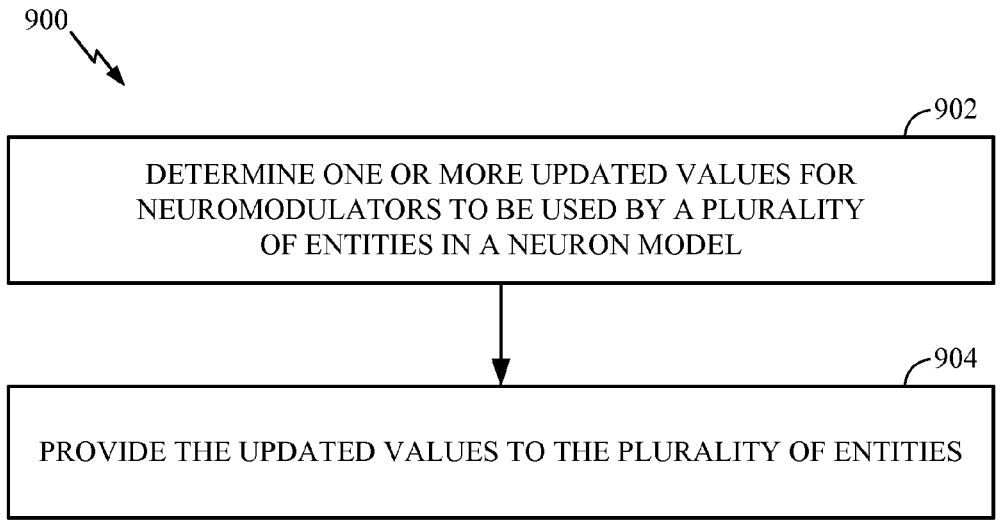
FIG. 9 is a flow diagram of example operations for globally updating and using artificial neuromodulator values in a neuron model, according to certain aspects of the present disclosure.

FIG. 9 is a flow diagram of example operations 900 for globally updating and using artificial neuromodulator values in a neuron model, according to certain aspects of the present disclosure. The operations 900 may be performed in hardware (e.g., by a superneuron), in software, or in firmware. The artificial nervous system may be modeled on a visual nervous system, for example.

The operations 900 may begin, at 902, by determining one or more updated values for artificial neuromodulators to be used by a plurality of entities in a neuron model. At 904, the updated values may be provided to the plurality of entities.

According to certain aspects, the updated values may be provided to entities within a superneuron that store the updated values locally, within the superneuron. For certain aspects, neuron-type parameters specify how to apply the updated values for the neuromodulators on a per-input-channel-per-neuron-type basis. The artificial neuromodulators may correspond to at least one of norepinephrine, acetylcholine, dopamine, or serotonin, for example. For certain aspects, the values for artificial neuromodulators may be computed based at least in part on spiking inputs in the artificial nervous system.

In an aspect, the entities may be artificial neurons. In this case, each input channel of each type of the artificial neurons may have a flag indicating whether the input channel is scaled by the updated values. In another aspect, the entities may be artificial synapses. For certain aspects, operation of the artificial nervous system is based at least in part on spiking events.

Figure 10:
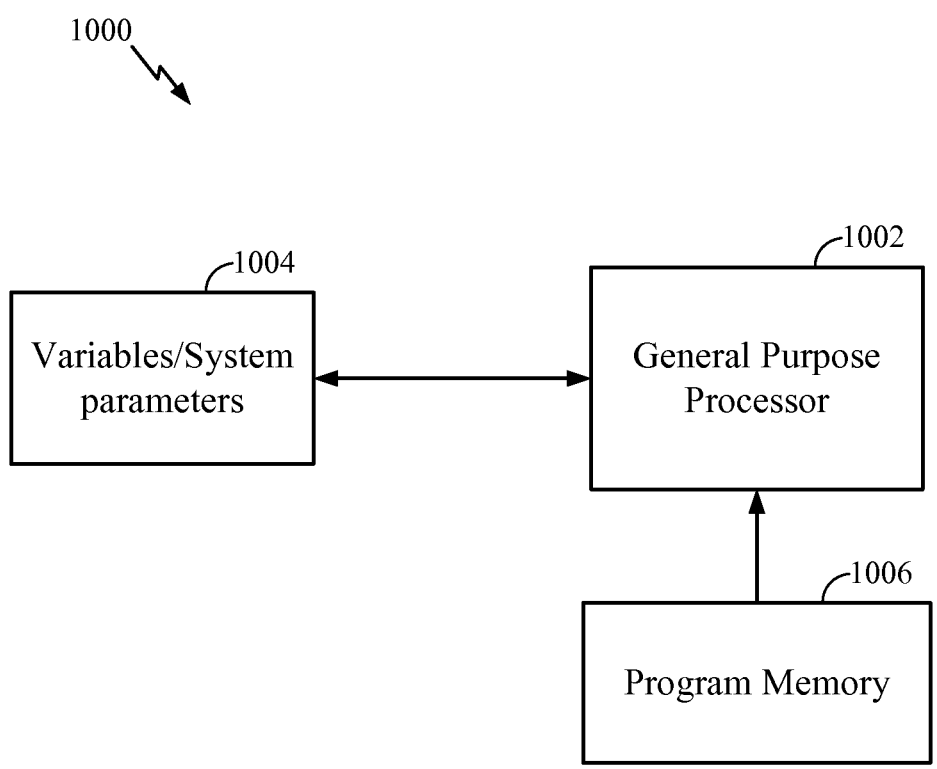
FIG. 10 illustrates an example implementation for operating an artificial nervous system using a general-purpose processor, in accordance with certain aspects of the present disclosure.

FIG. 10 illustrates an example block diagram 1000 of components for implementing the aforementioned method for operating an artificial nervous system using a general-purpose processor 1002 in accordance with certain aspects of the present disclosure. Variables (neural signals), synaptic weights, and/or system parameters associated with a computational network (neural network) may be stored in a memory block 1004, while instructions related executed at the general-purpose processor 1002 may be loaded from a program memory 1006. In an aspect of the present disclosure, the instructions loaded into the general-purpose processor 1002 may comprise code for determining one or more updated values for artificial neuromodulators to be used by a plurality of entities in a neuron model and code for providing the updated values to the plurality of entities.

Figure 11:
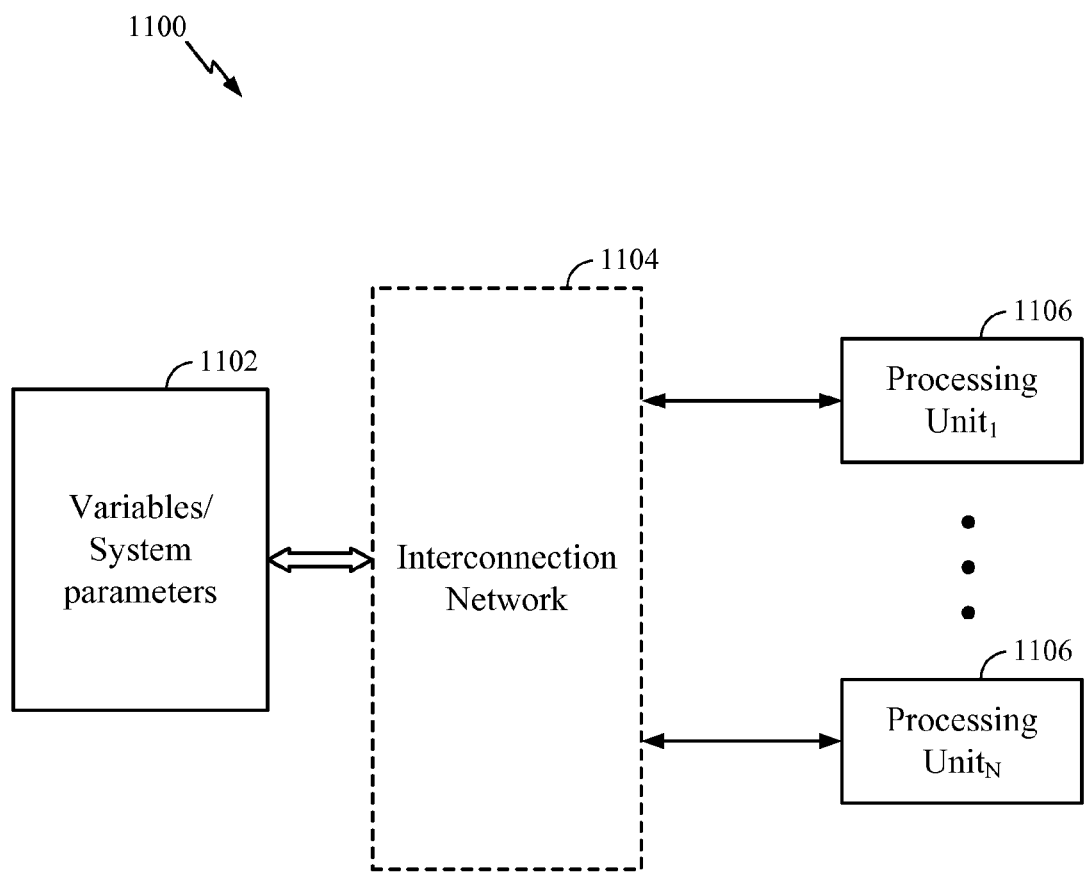
FIG. 11 illustrates an example implementation for operating an artificial nervous system where a memory may be interfaced with individual distributed processing units, in accordance with certain aspects of the present disclosure.

FIG. 11 illustrates an example block diagram 1100 of components for implementing the aforementioned method for operating an artificial nervous system where a memory 1102 can be interfaced via an interconnection network 1104 with individual (distributed) processing units (neural processors) 1106 of a computational network (neural network) in accordance with certain aspects of the present disclosure. Variables (neural signals), synaptic weights, and/or system parameters associated with the computational network (neural network) may be stored in the memory 1102, and may be loaded from the memory 1102 via connection(s) of the interconnection network 1104 into each processing unit (neural processor) 1106. In an aspect of the present disclosure, the processing unit 1106 may be configured to determine one or more updated values for artificial neuromodulators to be used by a plurality of entities in a neuron model and to provide the updated values to the plurality of entities.

Figure 12:
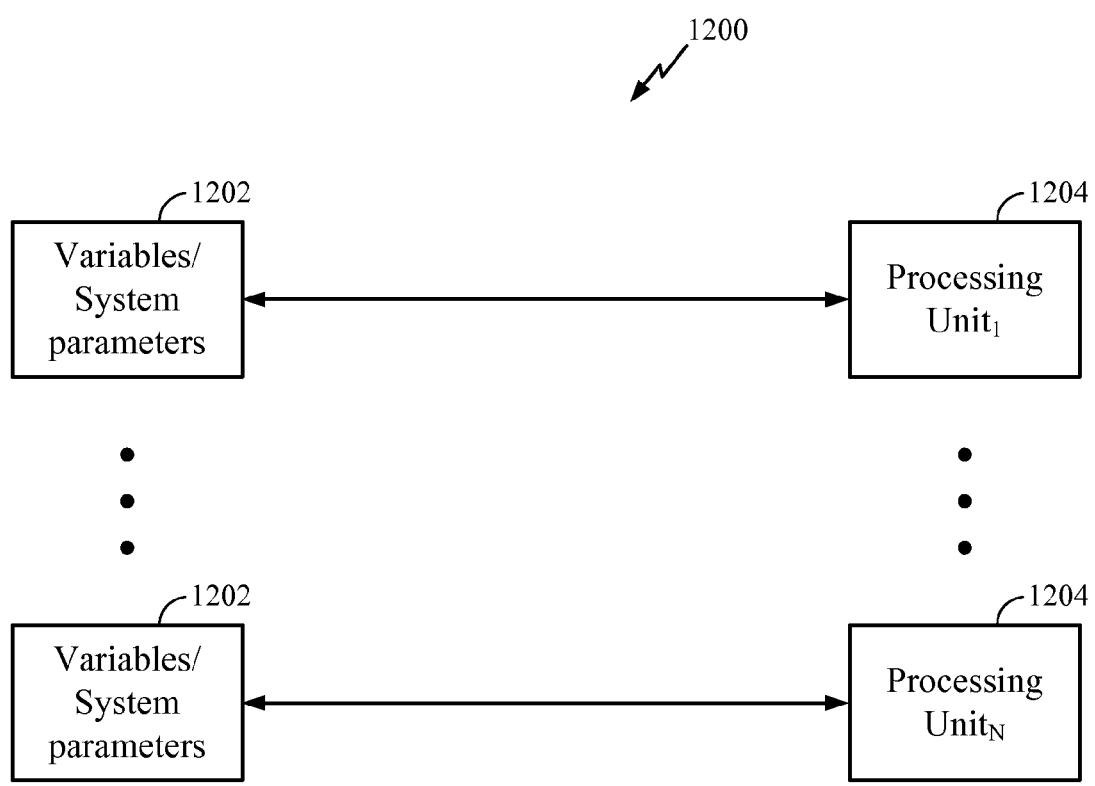
FIG. 12 illustrates an example implementation for operating an artificial nervous system based on distributed memories and distributed processing units, in accordance with certain aspects of the present disclosure.

FIG. 12 illustrates an example block diagram 1200 of components for implementing the aforementioned method for operating an artificial nervous system based on distributed memories 1202 and distributed processing units (neural processors) 1204 in accordance with certain aspects of the present disclosure. As illustrated in FIG. 12, one memory bank 1202 may be directly interfaced with one processing unit 1204 of a computational network (neural network), wherein that memory bank 1202 may store variables (neural signals), synaptic weights, and/or system parameters associated with that processing unit (neural processor) 1204. In an aspect of the present disclosure, the processing unit(s) 1204 may be configured to determine one or more updated values for artificial neuromodulators to be used by a plurality of entities in a neuron model and to provide the updated values to the plurality of entities.

Figure 13:
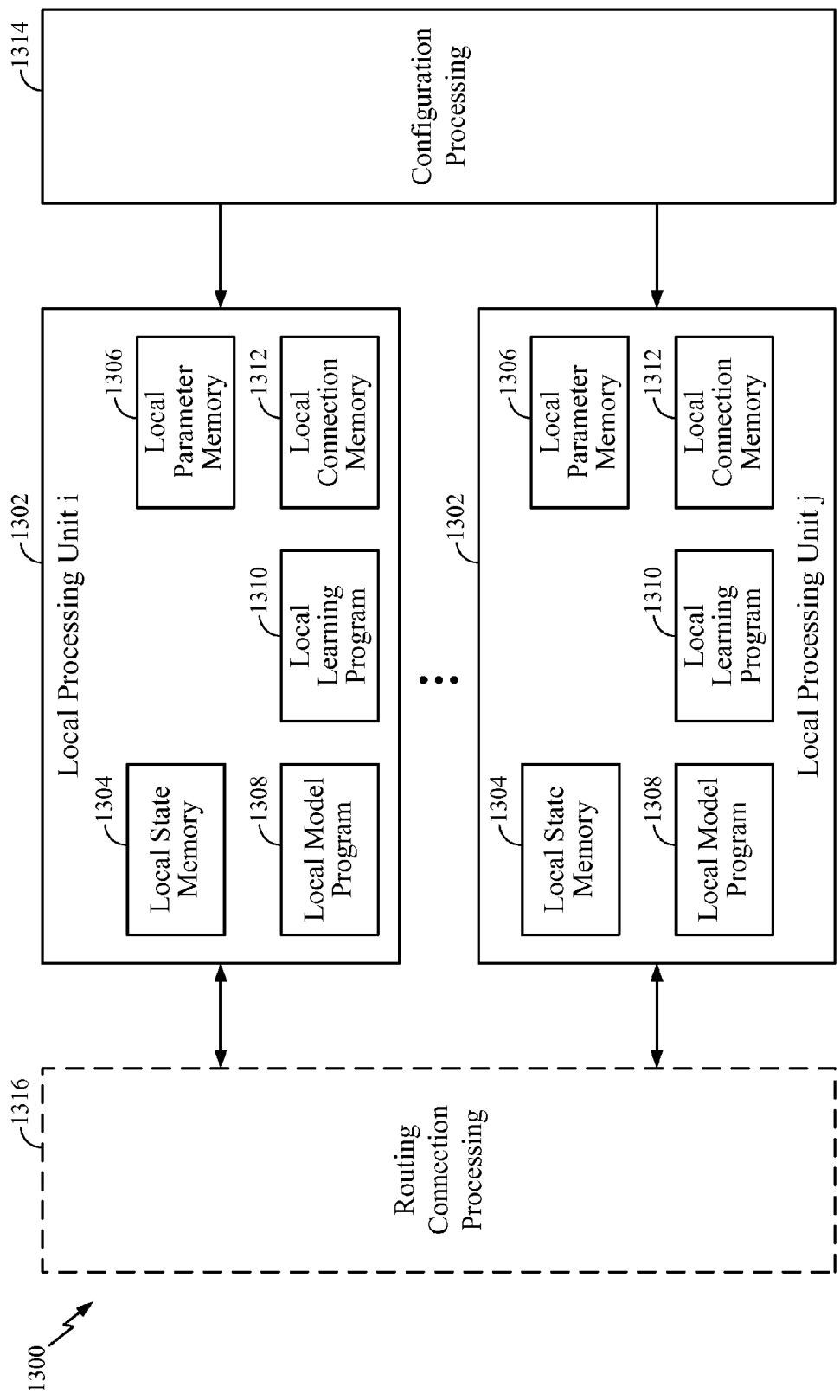
FIG. 13 illustrates an example implementation of a neural network in accordance with certain aspects of the present disclosure.

FIG. 13 illustrates an example implementation of a neural network 1300 in accordance with certain aspects of the present disclosure. As illustrated in FIG. 13, the neural network 1300 may comprise a plurality of local processing units 1302 that may perform various operations of methods described above. Each processing unit 1302 may comprise a local state memory 1304 and a local parameter memory 1306 that store parameters of the neural network. In addition, the processing unit 1302 may comprise a memory 1308 with a local (neuron) model program, a memory 1310 with a local learning program, and a local connection memory 1312. Furthermore, as illustrated in FIG. 13, each local processing unit 1302 may be interfaced with a unit 1314 for configuration processing that may provide configuration for local memories of the local processing unit, and with routing connection processing elements 1316 that provide routing between the local processing units 1302.

According to certain aspects of the present disclosure, each local processing unit 1302 may be configured to determine parameters of the neural network based upon desired one or more functional features of the neural network, and develop the one or more functional features towards the desired functional features as the determined parameters are further adapted, tuned and updated.

Figure 9A:
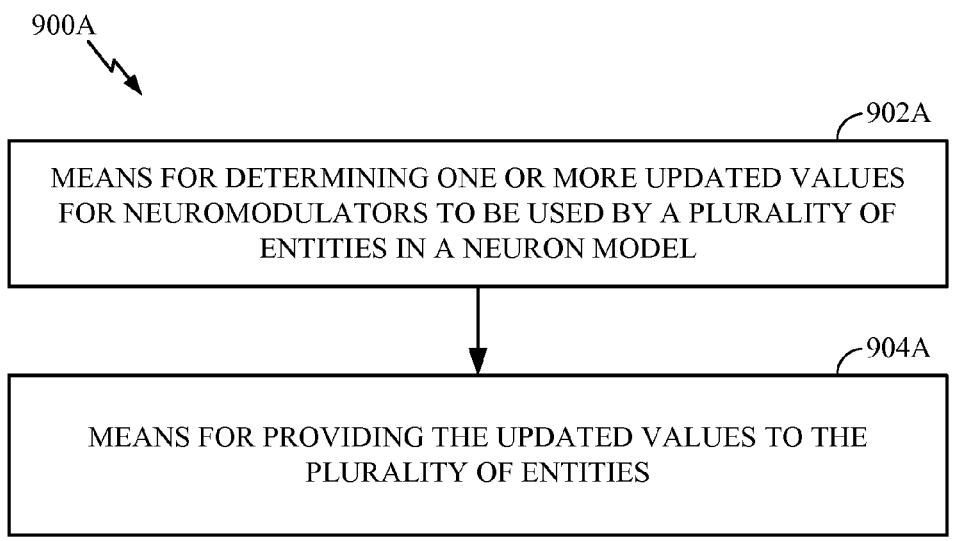
FIG. 9A illustrates example means capable of performing the operations illustrated in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 10-13. Generally, where there are operations illustrated in figures, those operations may have corresponding counterpart means-plus-function components with similar numbering. For example, operations 900 illustrated in FIG. 9 correspond to means 900A illustrated in FIG. 9A.

For example, means for displaying may comprise a display (e.g., a monitor, flat screen, touch screen, and the like), a printer, or any other suitable means for outputting data for visual depiction (e.g., a table, chart, or graph). Means for processing, means for receiving, means for accounting for delays, means for erasing, or means for determining may comprise a processing system, which may include one or more processors or processing units. Means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth.

A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for operating an artificial nervous system, comprising:
   determining one or more updated values for artificial neuromodulators to be used by a plurality of artificial neurons;
   storing the updated values locally as global values, at one of the plurality of artificial neurons, wherein:
      the plurality of artificial neurons are connected, via one or more synapses, to the artificial neuron storing the updated values;
      a type of each of the one or more synapses corresponds to a type of one of the artificial neuromodulators and is associated with a weight value; and
      determining the one or more updated values comprises updating the corresponding stored value for the artificial neuromodulators by the weight value when a spike occurs on the corresponding synapse; and
   providing the updated values to the plurality of artificial neurons.

2. The method of claim 1, wherein neuron-type parameters specify how to apply the updated values for the neuromodulators on a per-input-channel-per-neuron-type basis.

3. The method of claim 1, wherein the artificial neuromodulators correspond to at least one of norepinephrine, acetylcholine, dopamine, or serotonin.

4. The method of claim 2, wherein each input channel of each type of the artificial neurons has a flag indicating whether the input channel should be scaled by the updated values.

5. The method of claim 1, wherein operation of the artificial nervous system is based at least in part on spiking events.

6. An apparatus for operating an artificial nervous system, comprising:
   a processing system configured to:
      determine one or more updated values for artificial neuromodulators to be used by a plurality of artificial neurons;
      store the updated values locally as global values, at one of the plurality of artificial neurons, wherein:
         the plurality of artificial neurons are connected, via one or more synapses, to the artificial neuron storing the updated values,
         a type of each of the one or more synapses corresponds to a type of one of the artificial neuromodulators and is associated with a weight value, and
         determining the one or more updated values comprises updating the corresponding stored value for the artificial neuromodulators by the weight value when a spike occurs on the corresponding synapse; and
      provide the updated values to the plurality of artificial neurons; and
   a memory coupled to the processing system.

7. The apparatus of claim 6, wherein neuron-type parameters specify how to apply the updated values for the neuromodulators on a per-input-channel-per-neuron-type basis.

8. The apparatus of claim 6, wherein the artificial neuromodulators correspond to at least one of norepinephrine, acetylcholine, dopamine, or serotonin.

9. The apparatus of claim 7, wherein each input channel of each type of the artificial neurons has a flag indicating whether the input channel should be scaled by the updated values.

10. The apparatus of claim 6, wherein operation of the artificial nervous system is based at least in part on spiking events.

11. An apparatus for operating an artificial nervous system, comprising:
   means for determining one or more updated values for artificial neuromodulators to be used by a plurality of artificial neurons;
   means for storing the updated values locally as global values, at one of the plurality of artificial neurons, wherein:
      the plurality of artificial neurons are connected, via one or more synapses, to the artificial neuron storing the updated values,
      a type of each of the one or more synapses corresponds to a type of one of the artificial neuromodulators and is associated with a weight value, and
      determining the one or more updated values comprises updating the corresponding stored value for the artificial neuromodulators by the weight value when a spike occurs on the corresponding synapse; and
   means for providing the updated values to the plurality of artificial neurons.

12. The apparatus of claim 11, wherein neuron-type parameters specify how to apply the updated values for the neuromodulators on a per-input-channel-per-neuron-type basis.

13. The apparatus of claim 11, wherein the artificial neuromodulators correspond to at least one of norepinephrine, acetylcholine, dopamine, or serotonin.

14. The apparatus of claim 12, wherein each input channel of each type of the artificial neurons has a flag indicating whether the input channel should be scaled by the updated values.

15. The apparatus of claim 11, wherein operation of the artificial nervous system is based at least in part on spiking events.

16. A non-transitory computer-readable medium having instructions executable to:
   determine one or more updated values for artificial neuromodulators to be used by a plurality of artificial neurons;
   store the updated values locally as global values, at one of the plurality of artificial neurons, wherein:
      the plurality of artificial neurons are connected, via one or more synapses, to the artificial neuron storing the updated values,
      a type of each of the one or more synapses corresponds to a type of one of the artificial neuromodulators and is associated with a weight value, and
      determining the one or more updated values comprises updating the corresponding stored value for the artificial neuromodulators by the weight value when a spike occurs on the corresponding synapse; and
   provide the updated values to the plurality of artificial neurons.

17. The non-transitory computer-readable medium of claim 16, wherein neuron-type parameters specify how to apply the updated values for the neuromodulators on a per-input-channel-per-neuron-type basis.

18. The non-transitory computer-readable medium of claim 16, wherein the artificial neuromodulators correspond to at least one of norepinephrine, acetylcholine, dopamine, or serotonin.

19. The non-transitory computer-readable medium of claim 17, wherein each input channel of each type of the artificial neurons has a flag indicating whether the input channel should be scaled by the updated values.

20. The non-transitory computer-readable medium of claim 16, wherein operation of the artificial nervous system is based at least in part on spiking events.

* * * * *